United States Patent Office 3,705,923
Patented Dec. 12, 1972

3,705,923
METHOD FOR PREPARATION OF ORGANIC POLYSULFIDES
Alfred Bay Sullivan, Akron, Ohio, assignor to Monsanto Company, St. Louis, Mo.
No Drawing. Filed Nov. 28, 1969, Ser. No. 880,893
Int. Cl. C07c *149/32*
U.S. Cl. 260—608     16 Claims

ABSTRACT OF THE DISCLOSURE

A process for the preparation of organic polysulfides which comprises reacting a compound containing one or more —SH radicals with a sulfenamide characterized by the presence of a carbonyl group adjacent to the sulfenamide nitrogen.

---

METHOD FOR PREPARATION OF ORGANIC POLYSULFIDES

This invention relates to the manufacture of organic polysulfides. More particularly, it concerns the preparation of organic polysulfides from sulfenamides.

Organic polysulfides have a wide variety of commercial applications such as vulcanization accelerators or vulcanization agents in the curing of rubber and solvents or plasticizers for rubber or plastics. They may also be used as intermediates in the preparation of other organic compounds and as catalysts in addition reactions of olefinic unsaturated compounds. Certain ones are high pressure lubricants, while others biologically active, are useful as fungicides, insecticides, nematocides, and bacteriocides.

It is known that symmetrical organic disulfides may be produced by reaction of an organic chloride with sodium disulfide, by catalytic oxidation of a mercaptan using hydrogen peroxide and cupric chloride catalyst; by the reaction of elemental sulfur in the presence of a Friedel-Crafts catalyst with dialkyl sulfide, or by reaction of a mercaptan with sulfur under basic conditions. It is difficult to produce pure disulfides from reaction with sulfur because of formation of polysulfides. A process for converting organo-sulfenyl chlorides to disulfides is also known. In all the above-mentioned processes only symmetrical disulfides can be produced.

Asymmetrical organic disulfides have been produced by heating a mixture of two different symmetrical disulfides in the presence of an alkali sulfide to effect disproportionation or by oxidizing a mixture of two different mercaptans using a metal phthalocyanine catalyst.

One advantage of the present process is that both symmetrical and unsymmetrical organic disulfides or trisulfides may be produced under mild reaction conditions in absence of any catalyst whatsoever. Neither oxidative reagent nor hydroxide is required. The only materials needed are two reactants hereinafter described.

A further advantage is that substantially quantitative yields of essentially pure disulfides and trisulfides are produced by simple procedures; while another is that polysulfides having a wide variety of radicals and physical properties may be prepared. By variation of two simple reactants, it is possible to produce polysulfides having the desired molecular weight, solubility, boiling point, toxicity, or other property desired. The process also may be used in the purification of sour petroleum fractions and as an analytical procedure. These and other advantages will become apparent as the description of the invention proceeds, for example, the ability to recycle the imide formed as a by-product of the reaction.

SUMMARY OF THE INVENTION

According to the present invention, organic polysulfides may be produced by reacting a compound containing one or more —SH radicals with a sulfenamide characterized by the presence of a carbonyl group adjacent to the sulfenamide nitrogen. The characteristic nucleus is $$RS-\underset{|}{N}-\overset{O}{\underset{\|}{C}}-$$

where the dangling valence of the nitrogen may be linked to a second carbonyl, alkyl, aryl, cycloalkyl, hydrogen, alkylene carbon, or arylene carbon and R is alkyl, aryl, or cycloalkyl and the dangling valence on the carbonyl may be linked to alkyl, aryl, cycloalkyl, alkylene carbon or arylene carbon, and the unsatisfied dangling valences of the nitrogen and carbonyl radicals are satisfied by forming a heterocyclic ring through a common alkylene or arylene radical. Sulfenamides of this type are disclosed as prevulcanization inhibitors in the following patent applications amide, imide and urea sulfenamides are disclosed in Ser. No. 714,445, filed Mar. 20, 1968, now U.S. Pat. 3,546,185, issued Dec. 8, 1970; sulfenamides derived from dimercaptans and the above imides are disclosed in Ser. No. 80,815 filed Oct. 14, 1970, which is a division of Ser. No. 704,186, filed Sept. 20, 1967, now abandoned, said application 704,186 is a division of Ser. No. 646,202 filed June 15, 1967 which through continuation application Ser. No. 697,615, Jan. 15, 1968 is now U.S. Pat. 3,562,225, issued Feb. 26, 1971; cyclic urea sulfenamides are further disclosed in Ser. No. 696,123, filed Jan. 8, 1968, now U.S. Pat. 3,473,667 issued Oct. 21, 1969; and U.S. Pat. 3,427,319, issued Feb. 11, 1969; and also the thiosulfenamides are disclosed in Ser. No. 643,401, filed June 5, 1967, now U.S. Pat. 3,539,538, issued Nov. 10, 1970. All sulfenamides disclosed therein are hereby incorporated by reference into this application. All the amide, imide and urea sulfenamides disclosed are suitable for the practice of this invention.

Sulfenamides suitable for the practice of this invention include compounds of the formula

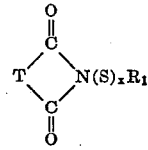

The reaction is represented by Equation I:

(I) 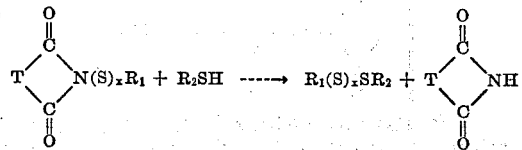

$R_1$ and $R_2$ individually are alkyl, cycloalkyl, aralkyl, alkenyl, aryl, alkaryl, acyl,

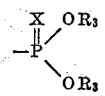

or benzothiazolyl and $x$ is one or two. The $R_1$ and $R_2$ radicals may contain substituents. Suitable substituents are chloro, bromo, fluoro, iodo, hydroxy, alkoxy or nitro, T represents (acyclic or cyclic), aliphatic, olefinic, or aromatic hydrocarbon divalent radicals. Examples of T are alkylene, alkenylene and arylene, such as phenylene.

If a symmetrical polysulfide is desired, then reactants containing similar $R_1$ and $R_2$ groups are selected, otherwise reactants having different $R_1$ and $R_2$ groups are selected. Both di- and tri-sulfides may be produced by the process. If a disulfide is desired, a monothioimide, meaning that $x$ is one, is selected; when a trisulfide is desired, then a dithioimide, $x$ is two, is selected.

The process is a general one having exceedingly wide applicability. The particular carbonyl thioimide and the nature of the radical attached to —SH are not significant. It appears that all known mercaptans and carbonyl thioimides are useful for the practice of this invention. In general, any compound having one or more —SH groups as the only reactive substituent is a suitable reactant.

Bis($R_1$-polysulfides) may be made by using a dithiol (dimercaptan) instead of a simple mercaptan or by using a bis thioimide and a simple mercaptan. The equations for these reactions are illustrated thusly:

(II)

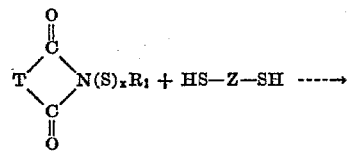

(III)

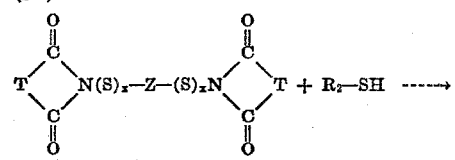

Where $R_1$, T and $x$ have the same meaning as before. Z is a divalent radical derived by removal of two hydrogen atoms from (acyclic or cyclic) aliphatic, olefinic or aromatic hydrocarbons. Examples of Z are alkylene, cycloalkylene, alkenylene, cycloalkenylene, or arylene. Lower alkylene of two to six carbon atoms or phenylene are the preferred radicals.

The preferred process for the preparation of organic polysulfides comprises reacting a thioimide of the formula:

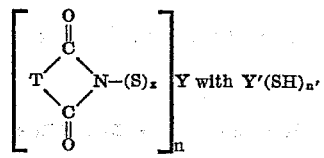 with $Y'(SH)_{n'}$ where T is alkylene, cycloalkylene, alkenylene, cycloalkenylene, or arylene, and $n$, $n'$ and $x$ are one or two; when $n$ and $n'$ are one, Y and Y' individually are

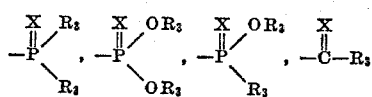

benzothiazolyl or $R_3$ where $R_3$ is alkyl, cycloalkyl, aralkyl, alkenyl, aryl, or alkaryl; X is oxygen or sulfur; when $n$ or $n'$ is two, Y or Y' respectively is selected from the group represented as T.

The term alkyl means any monovalent radical derived from an aliphatic saturated hydrocarbon by the removal of one hydrogen atom. Their general formula is $C_nH_{2n+1}$. The alkyl radical may be primary, secondary, or tertiary, and any carbon chain attached to the carbon from which the hydrogen is removed may be branched or unbranched. Alkyl radicals of 1–20 carbon atoms are suitable. Lower alkyl radicals of 1–10 carbon atoms are preferred. Cycloalkyl radicals are aliphatic cyclic hydrocarbons of the series $C_nH_{2n-1}$. The preferred cycloalkyl radicals contain 5–8 carbon atoms in the ring but cycloalkyl radicals of 3–12 carbon atoms are suitable. Aralkyl radicals are univalent alkyl radicals having an aryl radical attached to the aliphatic hydrocarbon chain. Preferred aralkyl radicals are benzyl, 1-phenethyl, 2-phenethyl, 2-phenylpropyl and 2-phenyl-2-propyl.

Alkenyl means a monovalent radical derived from an aliphatic unsaturated hydrocarbon by the removal of one hydrogen atom. Alkenyl belongs to the series $C_nH_{2n-1}$ and contains one double bond. Lower alkenyl radicals of 3–10 carbon atoms are preferred. Cycloalkenyl is a monovalent radical derived from an aliphatic cyclic unsaturated hydrocarbon by the removal of one hydrogen atom. Cycloalkenyl belongs to the series $C_nH_{2n-3}$ and contains one double bond. Lower cycloalkenyl radicals of 5 to 8 carbon atoms are preferred.

Aryl is a monovalent organic radical, the free valence of which belongs to an aromatic carbocyclic nucleus and not to a side chain. Phenyl, naphthyl and anthracenyl are examples. Alkaryl radicals are aryl radicals as described having lower alkyl radicals attached to the carbocyclic chain, examples of which are tolyl, xylyl, cumenyl and p-t-butylphenyl.

Acyl is an organic radical derived from an organic acid by removal of the hydroxyl group. This radical may be represented by the formula $$\overset{X}{\underset{A\overset{\|}{C}}{}}$$

where X is sulfur or oxygen and A is alkyl, aralkyl, cycloalkyl, aryl or alkaryl. A is preferably aryl, for example, benzoyl.

The term alkylene means any divalent radical derived from an aliphatic saturated hydrocarbon by the removal of two hydrogen atoms and has the general formula $C_nH_{2n}$. Lower alkylene radicals of 2–6 carbon atoms are preferred. Cycloalkylene is a divalent radical derived by removal of an additional hydrogen atom from a cycloalkyl radical. The general formula for cycloalkylenes is $C_nH_{2n-2}$. Cycloalkylenes of 5–8 carbon atoms are preferred.

Alkenylene means a divalent radical derived from an aliphatic unsaturated hydrocarbon by the removal of two hydrogen atoms. Alkenylene belongs to the series $C_nH_{2n-2}$ and contains one double bond. Lower alkenylene radicals of 2 to 10 carbon atoms are preferred. Cycloalkenylene means a divalent radical derived from removal of an additional hydrogen atom from a cycloalkenyl radical. The general formula for cycloalkenylenes is $C_nH_{2n-4}$ and contains one double bond. Lower cycloalkenylenes of 5 to 8 carbon atoms are preferred.

Specific examples of $R_1$ and $R_2$ are methyl, ethyl, propyl, isopropyl, butyl, isobutyl, sec.-butyl, tert.-butyl, amyl, hexyl, octyl, decyl, dodecyl, hexadecyl, eicosyl, cyclopentyl, cyclohexyl, cyclooctyl, cyclododecyl, benzyl, cumenyl, phenethyl, vinyl, phenyl, allyl, naphthyl, anthracenyl, 1-butenyl, 2-butenyl, pentenyl, hexenyl, tolyl, xylenyl, diethylphenyl, ethyltolyl, acetyl, benzoyl, toluyl, dimethoxyphosphoryl, dimethoxythiophosphoryl, diethyloxyphosphoryl, diethylthiophosphoryl, dibutoxyphosphoryl, dimethylphosphoryl, dimethylthiophosphoryl, diethylphosphoryl, diphenylphosphoryl, methylphenylphosphoryl, methylethylphosphoryl, ethylphenylphosphoryl, and 2-benzothiazolyl.

Examples of $R_1$ and $R_2$ when the radicals have substituents are 2-chloroethyl, 2-hydroxyethyl, 2-chloropropyl, 3-chloropropyl, 4-bromobutyl, 4-chlorophenyl, 2-bromophenyl, p-bromobenzyl, 3-chloropropenyl, 5-chloro(2-benzothiazolyl), 6-ethoxy(2-benzothiazolyl), 4-fluorocyclohexyl, 3-chlorocyclohexyl, 5-nitro(2-benzothiazolyl), and 4-nitrophenyl.

T is a divalent radical derived from the removal of two hydrogen atoms from (acyclic or cyclic) saturated aliphatic, olefinic, or aromatic hydrocarbon. The radicals are alkylene, aralkylene, cycloalkylene, alkenylene, cycloalkenylene, arylene, and alkarylene. Examples of such radicals are ethylene, propylene, butylene, amylene, hexylene, octylene, cyclobutylene, cyclopentylene, cyclohexylene, cyclooctylene, vinylene, propenylene, phenylene, and naphthylene. The heterocyclic radical made by the T group along with the two carbonyl groups and the nitrogen atom is an imido radical. Examples of such imido radicals are succinimdyl, glutarimidyl, adipimidyl, phthalimidyl, maleimidyl, and hydrophthalmidyl.

Illustrative symmetrical disulfides which may be prepared by the process of this invention are:

Dimethyl disulfide, diethyl disulfide, dipropyl disulfide, diisopropyl disulfide, di-n-butyl disulfide, di-t-butyl disulfide, diamyl disulfide, dioctyl disulfide, dicyclopentyl disulfide, dicyclohexyl disulfide, dicyclooctyl disulfide, dibenzyl disulfide, diphenyl disulfide, dinaphthyl disulfide, ditolyl disulfide, dixylenyl disulfide, di(ethyltolyl) disulfide, diacetyl disulfide, dibenzoyl disulfide, ditoluyl disulfide, and 2,2'-dithiobis(benzothiazole).

Illustrative asymmetrical disulfides which may be prepared by the process of this invention are:

Ethyl methyl disulfide, ethyl propyl disulfide, methyl propyl disulfide, ethyl t-butyl disulfide, ethyl hexyl disulfide, isopropyl octyl disulfide, n-butyl phenyl disulfide, ethyl phenyl disulfide, ethyl cyclopentyl disulfide, n-butyl cyclohexyl disulfide, cyclooctyl isopropyl disulfide, cyclooctyl phenyl disulfide, cyclohexyl phenyl disulfide, benzyl methyl disulfide, benzyl ethyl disulfide, benzyl cyclooctyl disulfide, benzyl phenyl disulfide, vinyl n-butyl disulfide, allyl phenyl disulfide, butenyl cyclohexyl disulfide, hexyl hexenyl disulfide, cyclopentyl phenyl disulfide, cyclohexyl phenyl disulfide, methyl tolyl disulfide, ethyl tolyl disulfide, butyl tolyl disulfide, ethyl naphthyl disulfide, benzyl tolyl disulfide, cyclohexyl tolyl disulfide, phenyl tolyl disulfide, benzoyl ethyl disulfide, benzoyl methyl disulfide, benzoyl propyl disulfide, benzyl hexyl disulfide, benzoyl cyclopentyl disulfide, benzoyl cyclohexyl disulfide, benzoyl phenyl disulfide, benzoyl benzyl disulfide, benzoyl tolyl disulfide, methyl benzothiazolyl disulfide, ethyl benzothiazolyl disulfide, t-butyl benzothiazolyl disulfide, cyclohexyl benzothiazolyl disulfide, phenyl benzothiazolyl disulfide, benzyl benzothiazolyl disulfide, tolyl benzothiazolyl disulfide, octyl benzothiazolyl disulfide, acetyl methyl disulfide, acetyl propyl disulfide, acetyl n-butyl disulfide, acetyl phenyl disulfide, acetyl benzyl disulfide, acetyl benzoyl disulfide.

O,O-diethylcyclohexylthiophosphorodithioate,
O,O-di-n-butylcyclohexylthiophosphorodithioate,
O,O-diethyl-S-phenylthiophosphorodithioate,
O,O-di-n-butyl-S-phenylthiophophorodithioate,
O,O-diethylcyclohexylthiophosphorothioate,
O,O-di-n-butylcyclohexylthiophosphorothioate,
O,O-diethyl-S-phenylthiophosphorothioate,
O,O-di-n-butyl-S-phenylthiophosphorothioate,
S-phenylthiodiphenylphosphinodithioate,
S-phenylthiodiethylphosphinodithioate,
S-cyclohexyldiphenylphosphinodithioate,
S-cyclohexylthiodiethylphosphinodithioate, and
S-n-butylthiodiphenylphosphinodithioate.

The reaction takes place in the presence or absence of solvent. However, it is convenient although not essential to carry out the reaction in an inert solvent and to select one in which one of the products is insoluble because separation and recovery of the product is thereby made easier. Also the precipitation of one of the products serves as a driving force for the reaction which results is complete conversion of reactants and high yield of polysulfide. The recovered imide may be converted to a thioimide and reused. Solvents suitable for carrying out the process are water, carbon tetrachloride, ether, acetone, alcohol, aliphatic hydrocarbon solvent such as heptane or aromatic hydrocarbon solvent such as benzene or toluene.

Another feature of this process is that it can be conducted at moderate temperatures. In fact, room temperature is sufficient. Generally, the reaction is conducted between 20°–100° C. The optimum temperature is determined by a number of factors such as reaction rate, boiling point of the solvent used, solubility of reactants or products, or stability of the products. In certain cases, higher reaction temperature may be used when the products are sufficiently stable.

The following specific embodiments are illustrative of the wide variety of disulfides which are produced via this process.

DESCRIPTION OF PREFERRED EMBODIMENTS

Example 1—Phenyl disulfide 5.5 grams (0.05 mole) of thiophenol (benzenethiol) are added to 12.7 grams (0.05 mole) of N-(phenylthio) phthalimide in 250 ml. of benzene at room temperature. After stirring for two hours, 7.3 grams of phthalimide (M.P. 232° C.) are recovered by filtration. The benzene is removed from the filtrate by evaporation under reduced pressure. The solid residue recovered is recrystallized from ethanol to give 9.6 grams (88% yield) of phenyl disulfide, a white solid melting at 59° C.

Example 2—2-(cyclohexyldithio)benzothiazole 0.85 gram (0.005 mole) of 2-mercaptobenzothiazole are added to 1.3 grams (0.005 mole) of N-(cyclohexylthio)phthalimide in 65 ml. of benzene at 40°–45° C. The reaction mixture is stirred between ½–1 hour after which the phthalimide is removed by filtration. After part of the benzene is evaporated under nitrogen, the mixture is filtered again to remove more phthalimide. The benzene solution is then extracted with dilute sodium hydroxide and the extract is washed with water. After drying over sodium sulfate, the remaining benzene is removed by evaporation. The residue is substantially pure 2-(cyclohexyldithio)benzothiazole. Elemental analysis of the product gives 4.86% nitrogen compared to 4.98% nitrogen calculated for $C_{13}H_{15}NS_3$.

Example 3—Cyclohexyl p-tolyl disulfide 12.4 grams (0.1 mole) of p-toluene thiol are stirred with 26.2 grams (0.1 mole) of N-(cyclohexylthio)phthalimide in 10 ml. of benzene for five hours at 60° C. After standing overnight at room temperature, 14.5 grams of a white solid (phthalimide, M.P. 234°–235° C.) are recovered by filtration. The solvent is removed by evaporation under reduced pressure leaving as the residue 23.2 grams (97.5% yield) of the asymmetrical disulfide. Identification of the product is made by gas-liquid-chromatography (GLC) analysis and nuclear-magnetic resonance spectral (NMR) analysis.

Example 4—Cyclohexyl o-tolyl disulfide 26.2 grams (0.1 mole) of N-(cyclohexylthio)phthalimide and 12.4 grams (0.1 mole) of o-toluene thiol in 250 ml. of carbon tetrachloride are refluxed for five hours and then stirred overnight at room temperature. The reaction mixture is filtered to obtain 14.3 grams of phthalimide (M.P. 234°–235° C. uncorrected). The solvent is evaporated and 21.0 grams (88% yield) of a yellow liquid are obtained. Identification of the cyclohexyl o-tolyl disulfide is made by GLC and NMR analyses.

Example 5—benzoylcyclohexyl disulfide 13.1 grams (0.05 mole) of N-(cyclohexylthio)phthalimide and 6.9 grams (0.05 mole) of benzoyl thiol(thiobenzoic acid) in 150 ml. of heptane are stirred overnight at room temperature. The precipitate is recovered by filtration, washed with carbon tetrachloride and dried. 7.3 grams of phthalimide (M.P. 234° C.) are obtained. The solvent is removed from the filtrate by evaporation under reduced pressure. 12 grams (95% yield) of product, a light brown liquid, are obtained. The identity of the benzoylcyclohexyl disulfide is confirmed by GLC and NMR analyses. Analysis gives 25.51% sulfur compared to 25.45% sulfur calculated for $C_{13}H_{16}OS_2$.

Example 6—O,O-diethylcyclohexylthiophosphorodithioate 18.6 grams (0.1 mole) of O,O-diethyl-S-hydrogen phosphorodithioate are added to 26 grams (0.1 mole) of N-(cyclohexylthio)phthalimide in 300 ml. of heptane at 70° C. After stirring for two hours at 70° C., 14.7 grams of phthalimide (white solid, M.P. 233°–234° C.) are recovered by filtration. The filtrate is evaporated to yield 28.0 grams (93% yield) of a yellow liquid which is identified as the desired disulfide.

Example 7—Cyclohexyl phenyl disulfide 11.0 grams (0.1 mole) of thiophenol are added to 21.3 grams (0.1 mole) of N-cyclohexylthiosuccinimide in 400 ml. of heptane at 90° C. After stirring 1.5 hours, 9.9 grams of succinimide (white solid M.P. 122° C.) are recovered by filtering the reaction mixture. After removal of the solvent by evaporation, 20.0 grams (89% yield) of a yellow liquid remains. GLC and NMR analyses confirm that the product is essentially pure cyclohexyl phenyl disulfide.

Example 8—Ethyl phenyl disulfide 2.75 grams (0.025 mole) of thiophenol are added to 5.1 grams (0.025 mole) of N-ethylthiophthalimide in 200 ml. of heptane at 90° C. and are stirred for three hours. The reaction mixture is filtered to give 3.5 grams of phthalimide, M.P. 232°–234° C. After evaporation of solvent under reduced pressure, 4.5 grams (100% yield) of ethyl phenyl disulfide are obtained.

Example 9—1,3-propylene bis(phenyl disulfide)

2.7 grams (0.025 mole) of 1,3-dimercaptopropane are added to 10.3 grams (0.05 mole) of N-phenylthiosuccinimide in 150 ml. of benzene at room temperature (~25° C.). After stirring for one hour, 4.9 grams of succinimide (M.P. 122° C.) are recovered by filtration. Evaporation of the solvent gives an oil identified as 1,3-propylene bis-(phenyl disulfide).

Example 10—Phenyl disulfide 5.5 grams (0.05 mole) of thiophenol are stirred with 10.2 grams (0.05 mole) of N-(phenylthio)maleimide in 150 ml. of benzene at room temperature for one hour. The benzene is removed from the reaction mixture by evaporation and the residue is added to 200 ml. of methanol. A white solid forms upon contact with the methanol which is recovered by filtration. The solid recovered is 9.2 grams (84% yield) of phenyl disulfide. Recrystallized from methanol, the product melts sharply at 60° C.

Example 11—2-(tert-butyldithio)benzothiazole 11.8 grams (0.05 mole) of N-(tert-butylthio)phthalimide and 8.5 grams (0.05 mole) of 2-mercaptobenzothiazole in 200 ml. of benzene are stirred at 70° C. for six hours. The reaction mixture is cooled and filtered to obtain 7.1 grams of phthalimide (white solid, M.P. 231° C.). The benzene is stripped from the filtrate by evaporation to give a solid residue. The residue recrystallized from methanol gives 9.3 grams of 2-(tert-butyldithio)benzothiazole, M.P. 80.0°–80.5° C. Another 3.0 grams of product are obtained upon concentration of the alcoholic filtrate.

Example 12—Phenyl disulfide

This example illustrates that the disulfides may be prepared without the use of solvent. 12.1 grams (0.11 mole) of thiophenol are added in one portion to 20.7 grams of N-phenylthio succinimide. The reaction container is blanketed with nitrogen to reduce the presence of moisture. The temperature of the reaction mixture rises from 23° C. to 58° C. After stirring for 15 minutes, 400 ml. of water (at 70°–75° C.) are added and the mixture stirred 10 more minutes. The slurry is cooled and then filtered to recover 21.0 grams (96% yield) of phenyl disulfide. Recrystallized from methanol, the product melts at 59° C.

Example 13—Benzyl disulfide 1.35 grams (0.005 mole) of N-benzylthiophthalimide and 0.68 gram (0.0055 mole) of benzylmercaptan in 40 ml. of benzene are stirred at room temperature for about 44 hours. The reaction mixture is filtered to remove phthalimide. The filtrate is washed four times with 20 ml. portions of 0.1 N sodium hydroxide solution to remove additional phthalimide and excess thiol. The benzene is removed by evaporation leaving 1.135 grams (92% yield) of benzyl disulfide. The product recrystallized from methanol is a white solid which melts at 68°–69° C.

Example 14—n-Butyl benzyl disulfide 1.187 grams (0.005 mole) of N-n-butylthiophthalimide and 0.68 gram (0.0055 mole) of benzylmercaptan in 40 ml. of benzene are stirred for two days at room temperature. The mixture is then heated for 1.5 hours to 50° C. and allowed to stand overnight. The mixture is cooled to 5°–10° C. and filtered to remove phthalimide. The filtrate is washed four times with 20 ml. of 0.1 N sodium hydroxide solution and once with water. The benzene layer is separated and evaporated to give 0.87 gram (82% yield) of an amber liquid, identified by NMR and GLC analyses to be n-butyl benzyl disulfide.

Example 15—Allyl phenyl disulfide 7.4 grams (0.1 mole) of 2-propene-1-thiol (allyl mercaptan) are added to 20.0 grams (0.1 mole) of N-phenylthiosuccinimide in 300 ml. of benzene and are stirred for eight hours at room temperature. 8.5 grams of succinimide (M.P. 123°–124° C.) are recovered by filtration. The filtrate is washed with 0.1 N sodium hydroxide and then with water. The washed filtrate is dried over sodium sulfate, filtered to remove the sodium sulfate and evaporated at reduced pressure to yield 17.0 grams of crude allyl phenyl disulfide. The crude allyl phenyl disulfide is distilled and 11.8 grams of pure product are collected at 75°–79° C. and 0.5 mm. Hg.

Example 16—Phenyl disulfide

This example illustrates the preparation of the disulfides in the presence of water. 5.5 grams (0.05 mole) of thiophenol are added to 10.4 grams (0.05 mole) of N-phenylthiosuccinimide slurried in 250 ml. of water and the mixture is stirred for one hour. 11.0 grams (100% yield) of phenyl disulfide are recovered by filtration. The succinimide formed remains in the filtrate. Recrystallized from methanol, the phenyl disulfide melts at 59° C.

Example 17—1,6-bis phenyl n-hexyl disulfide

This example illustrates the preparation of bis-alkyl disulfides. 1.12 grams (0.01 mole) of thiophenol are added to 2.21 grams (0.005 mole) of 1,6-bis(N-thiophthalimido)-n-hexane in 80 ml. of benzene. The reaction mixture is heated at 60° C. for three hours and then allowed to cool and stand overnight at room temperature. The mixture is filtered to remove phthalimide. The filtrate is extracted with several 20 ml. portions of 0.1 N NaOH and then extracted with 20 ml. of water. The benzene solution is filtered to remove traces of water and the benzene evaporated to yield an amber liquid identified by NMR analysis as 1,6-bis phenyl n-hexyl disulfide.

Example 18—Phenyl-tert-octyl trisulfide

This example and Example 19 demonstrate the preparation of an unsymmetrical trisulfide by reacting a mercaptan and a dithiophthalimide.

0.561 gram (0.005 mole) of thiophenol are added to 1.61 grams (0.005 mole) of N-tert-octyldithiophthalimide in 40 ml. of benzene at 55° C. and stirred for four hours. The reaction mixture is cooled to room temperature and is stirred overnight. Phthalimide is recovered from the mixture by filtration. The filtrate is washed with 0.1 N NaOH and with water. The benzene is removed by evaporation. 1.42 grams (99.5% yield) of phenyl-tert-octyl trisulfide (an amber liquid) are obtained. The product is identified by NMR analysis.

Example 19—Benzyl-tert-octyl trisulfide 0.372 gram (0.003 mole) of benzyl mercaptan are added to 0.809 gram (0.0025 mole) of N-tert-octyldithiophthalimide in 25 ml. of benzene. The reaction mixture is stirred for 48 hours at room temperature. The mixture is washed with 3 portions of 0.1 N NaOH and one portion of water to remove the phthalimide and then is dried over sodium sulfate. The benzene is evaporated at room temperature to yield 0.752 gram of an amber oil (100% yield). Upon standing, solids (phthalimide) formed in the crude product. The product is extracted with petroleum ether leaving behind the solids. The ether is evaporated to recover the purified product. The product is identified by NMR analysis as benzyl-tert-octyl trisulfide.

Example 20—Phenyl disulfide

This example demonstrates the use of an urea sulfenamide as one of the reactants. 1.0 gram (0.009 mole) of thiophenol is added to 1.6 grams (0.0045 mole) of 1,3-bis - phenylthio - 2 - benzimidazolinone. The temperature rises from 30° to 40° C. The reaction mixture is permitted to cool one hour to room temperature. The gummy solid which forms is extracted with hot heptane and filtered. The white solid recovered is benzimidazolidone, M.P. 315° C. Phenyl disulfide, 95.5% yield, M.P. 58° C., is recovered from the filtrate by evaporation of the heptane.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for the preparation of organic polysulfides which comprises reacting a compound $Y'(SH)_{n'}$ with a compound selected from the group consisting of the formulas:

(a)

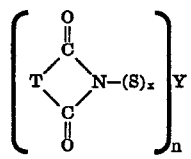

and (b)

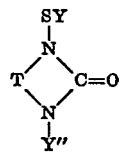

where T is alkylene, cycloalkylene, alkenylene, cycloalkenylene or arylene, Y''' is hydrogen or —SY, and $n$, $n'$ and $x$ are one or two; when $n$ and $n'$ are one, Y and Y' individually are alkyl, cycloalkyl, aralkyl, alkenyl, aryl, or alkaryl; when $n$ or $n'$ is two, Y and Y' have the same meaning as T.

2. The process of claim 1 wherein 1,3-bis-phenyl-thio-2-benzimidazolinone is reacted with thiophenol.

3. A process according to claim 1 wherein $n$, $n'$ and $x$ are one.

4. A process according to claim 1 wherein the sum of $n$ and $n'$ is no more than three.

5. A process according to claim 3 wherein T is arylene.

6. A process according to claim 5 wherein Y and Y' individually are alkyl, cycloalkyl, or aryl.

7. A process according to claim 6 wherein T is ortho-phenylene.

8. A process according to claim 7 wherein Y is cyclohexyl.

9. A process according to claim 6 wherein Y and Y' are phenyl.

10. A process according to claim 1 wherein

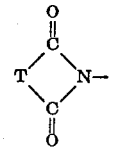

is an imido radical selected from the group consisting of phthalimidyl, succinimidyl, or maleimidyl.

11. A process according to claim 10 wherein Y and Y' individually are alkyl, cycloalkyl, or aryl.

12. A process according to claim 1 wherein T is arylene, $x$ is one, $n$ is two, Y is alkylene and Y' is alkyl, cycloalkyl or aryl.

13. A process according to claim 1 wherein T is arylene, $x$ is one, $n'$ is two, Y is alkyl, cycloalkyl, or aryl and Y' is alkylene.

14. A process according to claim 1 wherein T is ortho-phenylene, $n$ and $n'$ are one, $x$ is two, and Y and Y' individually are alkyl, cycloalkyl or aryl.

15. A process according to claim 1 wherein T is arylene, $n$, $n'$ and $x$ are one, and Y and Y' individually are aralkyl, alkenyl or alkaryl.

16. A process according to claim 1 wherein T is alkylene, $n$, $n'$ and $x$ are one, and Y and Y' individually are alkyl, cycloalkyl, aralkyl, alkenyl, aryl, or alkaryl.

References Cited

UNITED STATES PATENTS 3,546,185   12/1970   Coran et al. _____ 260—79.5

OTHER REFERENCES

Behforouz et al.: J. Org. Chem., v. 34, p. 51 (1969).

LEWIS GOTTS, Primary Examiner

D. R. PHILLIPS, Assistant Examiner

U.S. Cl. X.R.

260—306.5, 453 R, 545 R